US012274919B2

(12) United States Patent
Richard

(10) Patent No.: US 12,274,919 B2
(45) Date of Patent: Apr. 15, 2025

(54) METHOD FOR TIMING A SPORTS COMPETITION IN DIFFERENT SITES

(71) Applicant: Swiss Timing Ltd, Corgémont (CH)

(72) Inventor: Pascal Richard, Corgémont (CH)

(73) Assignee: SWISS TIMING LTD, Corgemont (CH)

( * ) Notice: Subject to any disclaimer, the term of this patent is extended or adjusted under 35 U.S.C. 154(b) by 550 days.

(21) Appl. No.: 17/322,123

(22) Filed: May 17, 2021

(65) Prior Publication Data

US 2022/0001239 A1 Jan. 6, 2022

(30) Foreign Application Priority Data

Jul. 3, 2020 (EP) .................................... 20183895

(51) Int. Cl.
*A63B 24/00* (2006.01)
*A63B 71/06* (2006.01)
*G07C 1/24* (2006.01)

(52) U.S. Cl.
CPC ...... *A63B 24/0084* (2013.01); *A63B 24/0062* (2013.01); *A63B 71/0686* (2013.01); *G07C 1/24* (2013.01); *A63B 2225/20* (2013.01)

(58) Field of Classification Search
CPC ............ A63B 24/0084; A63B 24/0062; A63B 71/0686; A63B 2225/20; G07C 1/24
See application file for complete search history.

(56) References Cited

U.S. PATENT DOCUMENTS

| | | | | |
|---|---|---|---|---|
| 8,182,348 | B2 * | 5/2012 | Uhlir | A63F 13/798 463/6 |
| 8,600,699 | B2 * | 12/2013 | Vock | A63B 69/18 702/150 |
| 11,229,825 | B1 * | 1/2022 | Wachirajindakul | A63B 24/0075 |
| 11,624,914 | B2 * | 4/2023 | Zhovnirovsky | A61B 5/6803 345/8 |

(Continued)

FOREIGN PATENT DOCUMENTS

| | | |
|---|---|---|
| CN | 105 797 311 A | 7/2016 |
| EP | 1 139 299 A1 | 10/2001 |

(Continued)

OTHER PUBLICATIONS

European Search Report of EP 20 18 3895 dated Nov. 24, 2020.

*Primary Examiner* — Malina D. Blaise
(74) *Attorney, Agent, or Firm* — Sughrue Mion, PLLC

(57) ABSTRACT

A timing method for a sports competition at the same time on different sites (4) around the world. In a first phase, all time bases of the timing devices, of a start coordinator device (3) and of each site are synchronised. Next, a measurement of the transmission times between the start coordinator device and each site is performed to determine a maximum transmission time. The start coordinator device establishes a start time equal to the time of the date of each site and while adding a time difference longer than the determined maximum transmission time. The start time is adapted to each site where the competition takes place to automatically order, by each timing device, the start of the competition at the same time on each site and on the base site of the start coordinator device to have a sports competition taking place live on all competition sites.

17 Claims, 4 Drawing Sheets

(56) References Cited

U.S. PATENT DOCUMENTS

| | | | | |
|---|---|---|---|---|
| 2009/0291726 | A1* | 11/2009 | Svensson | G01S 5/0072 463/7 |
| 2010/0248901 | A1* | 9/2010 | Martens | A63F 13/80 482/8 |
| 2017/0007882 | A1* | 1/2017 | Werner | A63B 24/0021 |
| 2017/0259156 | A1* | 9/2017 | DeAngelis | A63K 1/00 |
| 2018/0036632 | A1* | 2/2018 | Poynter | G08G 5/0026 |
| 2019/0350472 | A1* | 11/2019 | Zhovnirovsky | A61B 5/0816 |
| 2019/0353902 | A1* | 11/2019 | Zhovnirovsky | A61B 5/742 |
| 2019/0357009 | A1* | 11/2019 | DeAngelis | A61B 5/6895 |
| 2020/0089006 | A1* | 3/2020 | Zhovnirovsky | G02B 27/0093 |
| 2020/0186575 | A1* | 6/2020 | Rofe | H04L 65/765 |
| 2021/0354002 | A1* | 11/2021 | Schaefer | A63B 71/0622 |
| 2022/0108589 | A1* | 4/2022 | Choung | G07F 17/3267 |
| 2022/0143461 | A1* | 5/2022 | DeAngelis | A63B 71/0616 |
| 2022/0143465 | A1* | 5/2022 | Wachirajindakul | A63B 24/0006 |
| 2022/0269090 | A1* | 8/2022 | Zhovnirovsky | A61B 5/02433 |
| 2022/0270447 | A1* | 8/2022 | Choung | G07F 17/3225 |
| 2023/0104977 | A1* | 4/2023 | Zaghetto | H04N 19/597 375/240.02 |

FOREIGN PATENT DOCUMENTS

| | | | |
|---|---|---|---|
| EP | 2 453 323 | A1 | 5/2012 |
| JP | 4489563 | B2 | 6/2010 |

* cited by examiner

Fig. 1
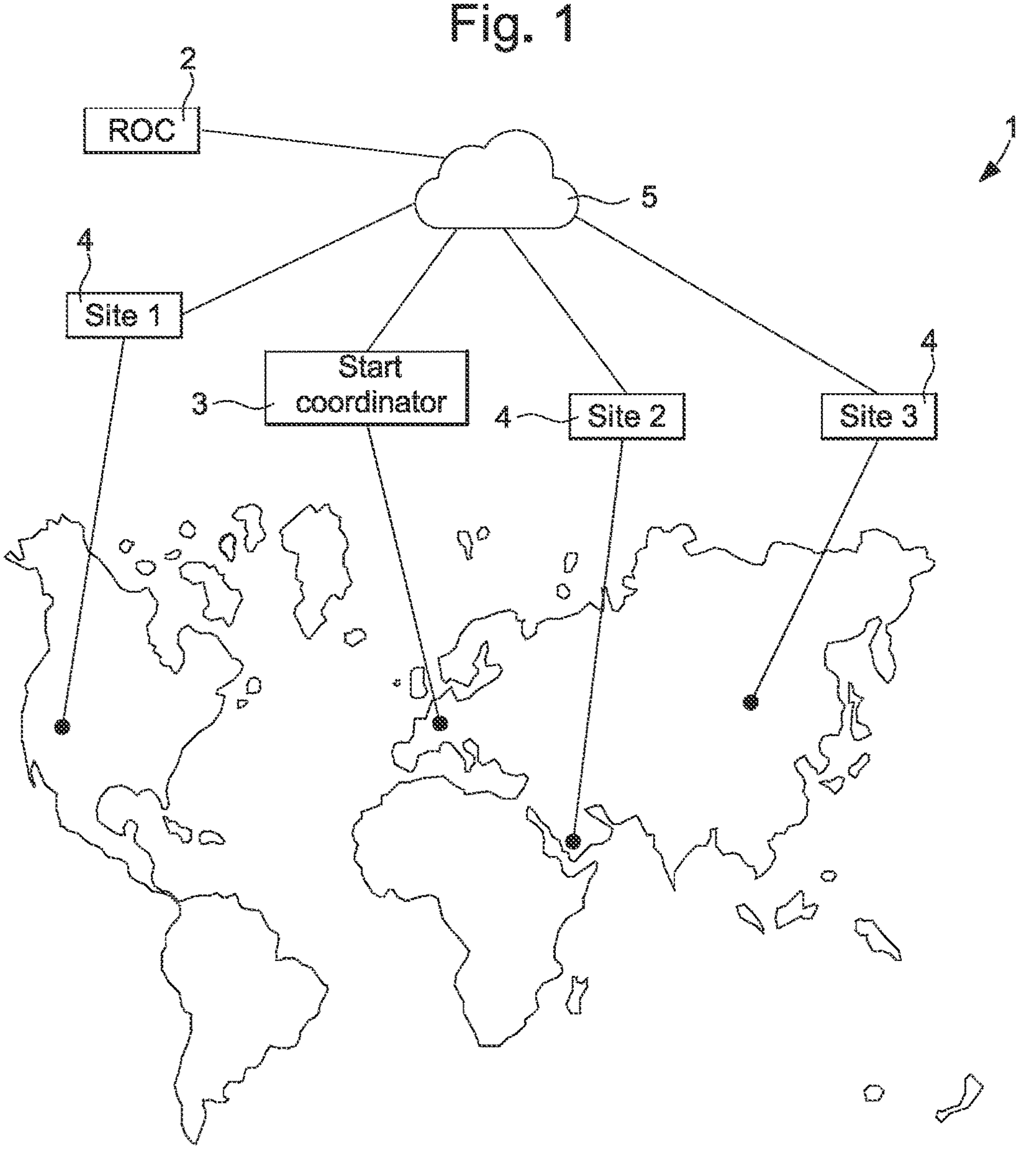
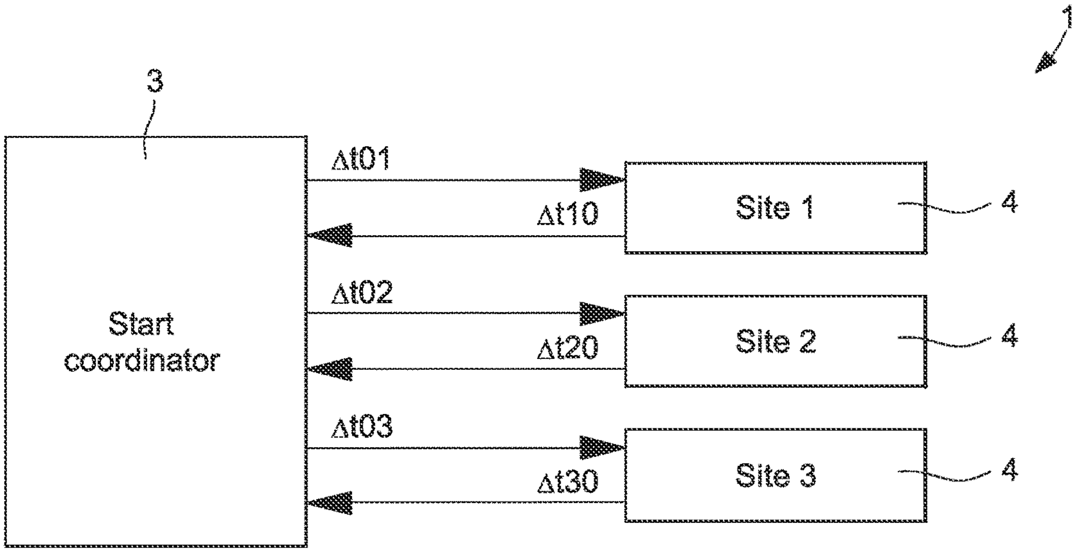

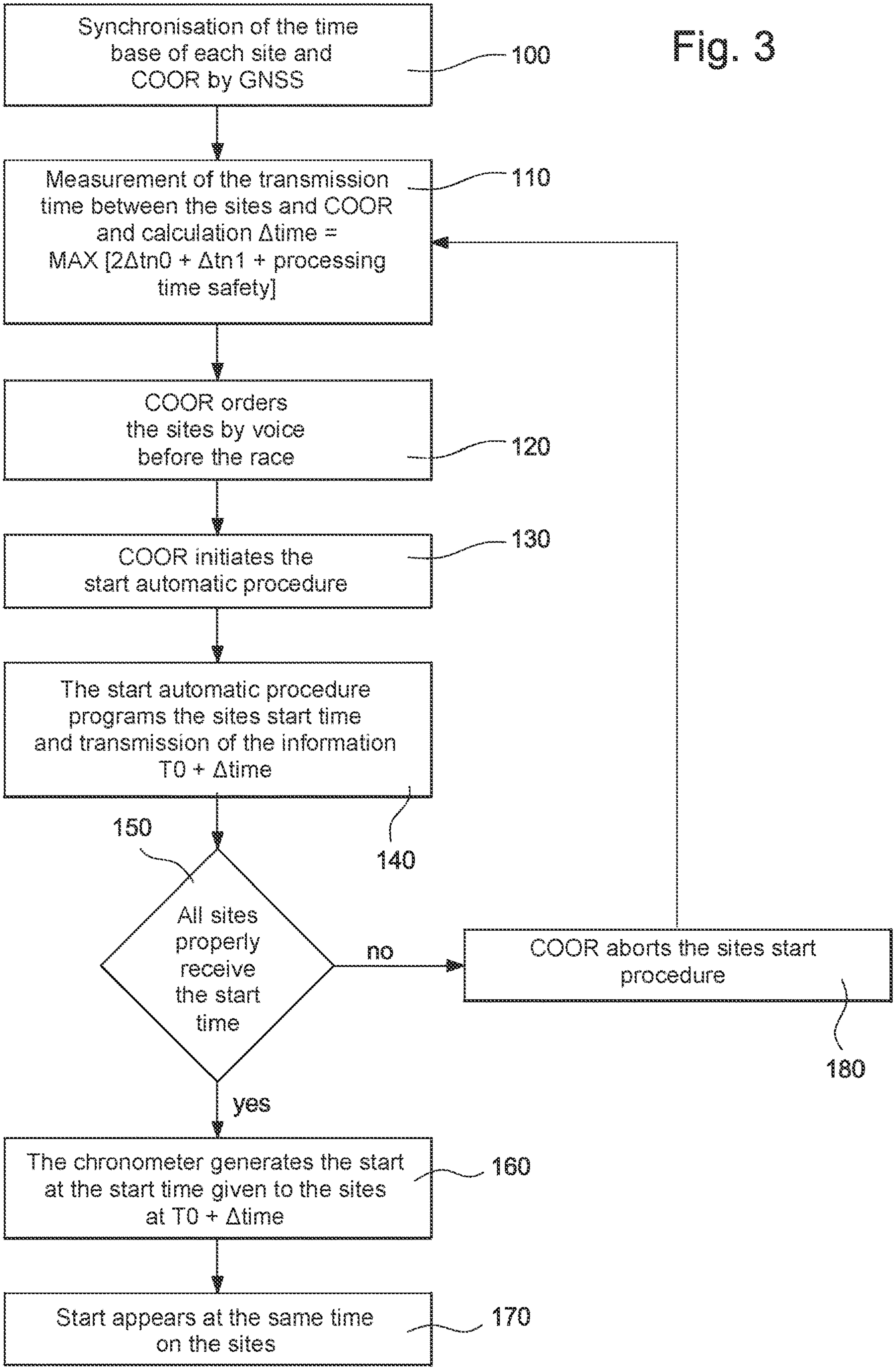
Fig. 3
Synchronisation of the time base of each site and COOR by GNSS
100
Measurement of the transmission time between the sites and COOR and calculation Δtime = MAX [2Δtn0 + Δtn1 + processing time safety]
110
COOR orders the sites by voice before the race
120
COOR initiates the start automatic procedure
130
The start automatic procedure programs the sites start time and transmission of the information T0 + Δtime
140
150
All sites properly receive the start time
no
COOR aborts the sites start procedure
180
yes
The chronometer generates the start at the start time given to the sites at T0 + Δtime
160
Start appears at the same time on the sites
170

METHOD FOR TIMING A SPORTS COMPETITION IN DIFFERENT SITES

CROSS REFERENCE TO RELATED APPLICATIONS

This application is claiming priority based on European Patent Application No. 20183895.0 filed on Jul. 3, 2020, the disclosure of which is incorporated herein in its entirely by reference.

FIELD OF THE INVENTION

The invention relates to a method for timing a sports competition with participants on different sites. Preferably, the sites are far enough from each other and scattered around the world.

The invention also relates to a timing system for the implementation of the timing method.

BACKGROUND OF THE INVENTION

In general, international sports competitions imply performing different trips and crowd meetings. There is now a tendency to organize off-site events with athletes and spectators scattered around the world. In order to preserve the competition spirit, the athletes must compete against each other in real-time as if they were in the same stadium.

However, the management of such competitions on different sites gives rise to the problem of accuracy and validity of the time of each participant once the finish line is crossed. The same race start for each participant on the different sites cannot guarantee the accuracy of the time of each participant, because the time bases of the different chronometers are not necessarily calibrated or synchronised and depend on the weather conditions of the race location. In addition, since starts are given on different sites which may be very far apart from each other, the transmission delays, which may be variable, are not generally taken into account. Thus, synchronous starts cannot be given to provide real-time information, via the internet, to both the participant and the spectator viewing the race.

SUMMARY OF THE INVENTION

Hence, the invention aims to overcome the aforementioned drawbacks of the prior art by providing a method for timing a sports competition with participants or competitors on different sites while taking into account the variable signal transmission times between the sites to give synchronised starts in real-time, for example in the milliseconds range, for the participant or athlete or also the spectator viewing the sports competition.

To this end, the invention relates to a method for timing a sports competition on different sites, which comprises the features defined in the independent claim 1.

Particular steps of the method for timing a sports competition at the same time on different sites are defined in the dependent claims 2 to 12.

An advantage of the timing method lies in that it consists of a new competition format taking place at the same time on different sites around the world. The variable transmission times between the different sites have to be taken into account in order to have all sites properly receiving the start time. According to the timing method, the participants or competitors are ready to run on the orders of the same starter judge for all sites. For this purpose and before the start, there is mainly a measurement of this transmission time between the start coordinator device, and each site of the sports competition. A synchronisation of the time base of each site and of the start coordinator device is performed through a transmission of GNSS or GPS signals. Each site sends its time to the start coordinator device, for example every second. The latter notes the reception time with respect to its clock and can therefore calculate the return transmission time. The same operation is performed in the other way to calculate the forward transmission time. Thus, a maximum transmission time to be taken into account to validate each start in total safety is determined. Preferably, it is possible to take into account the double of the maximum forward transmission time from the start coordinator device to each site plus the maximum return transmission time to obtain a processing time safety. Once the time of each site has been accurately synchronised, there will always be super-accurate starts once the start is given for each site, because the race time does not change according to the local time. The different local times of the different sites which may be disposed throughout the world are known so as to perform a race at the same time on each site around the world.

Advantageously, after synchronisation of the different times of the time bases of the timing devices of the different sites and of the start coordinator device, it is possible to give the synchronised starts of the different sites in real-time by one single start coordinator device. Thus, it is possible to view each race through a TV broadcast or on a display screen disposed in the stadium for the spectators, for example on each site. The timing of the start signal with a reference and the measurement of the arrival time is carried out locally. The time reference for these start systems is based on the same GPS source. Thus, the reliability of the measured time is guaranteed, because the start and arrival signals and the time reference remain local.

Advantageously, these sports competitions taking place on several sites at the same time can be performed without problems for sports such as swimming, track cycling, or other sports that are do not depend too much on weather conditions during the competition. The start signal of each of these sports competitions is ordered by voice by a race coordinator at a time well defined in advance and known to each athlete. Hence, the start time on each site is defined according to the estimated maximum transmission delay between all sites and the start coordinator device, which can give the start. The aim is for the estimated delay to be as short as possible so as to create the appearance of a real-time start within a tenth of a second on each site. However, once all time bases are synchronised, the start may be given at any location or site of the competition by the timing device of the start coordinator device.

Advantageously, the start procedure is monitored by one starter for all sites. He receives the necessary information and manages the start and the race.

The invention also relates to a system for timing a sports competition for the implementation of the timing method which comprises the features defined in the independent claim 13.

Particular embodiments of the timing system are defined in the dependent claims 14 to 17.

BRIEF DESCRIPTION OF THE DRAWINGS

The objects, advantages and features of the method and system for timing a sports competition at the same time on different competition sites according to the invention will appear better in the following description of at least one non-limiting embodiment illustrated by the drawings in which:

FIG. 1 represents, in a simplified way, a system for timing a sports competition in real-time and at the same time on several different sites for the implementation of the timing method according to the invention and while taking into account the transmission times between the sites.

DETAILED DESCRIPTION OF THE INVENTION

Figure 2:
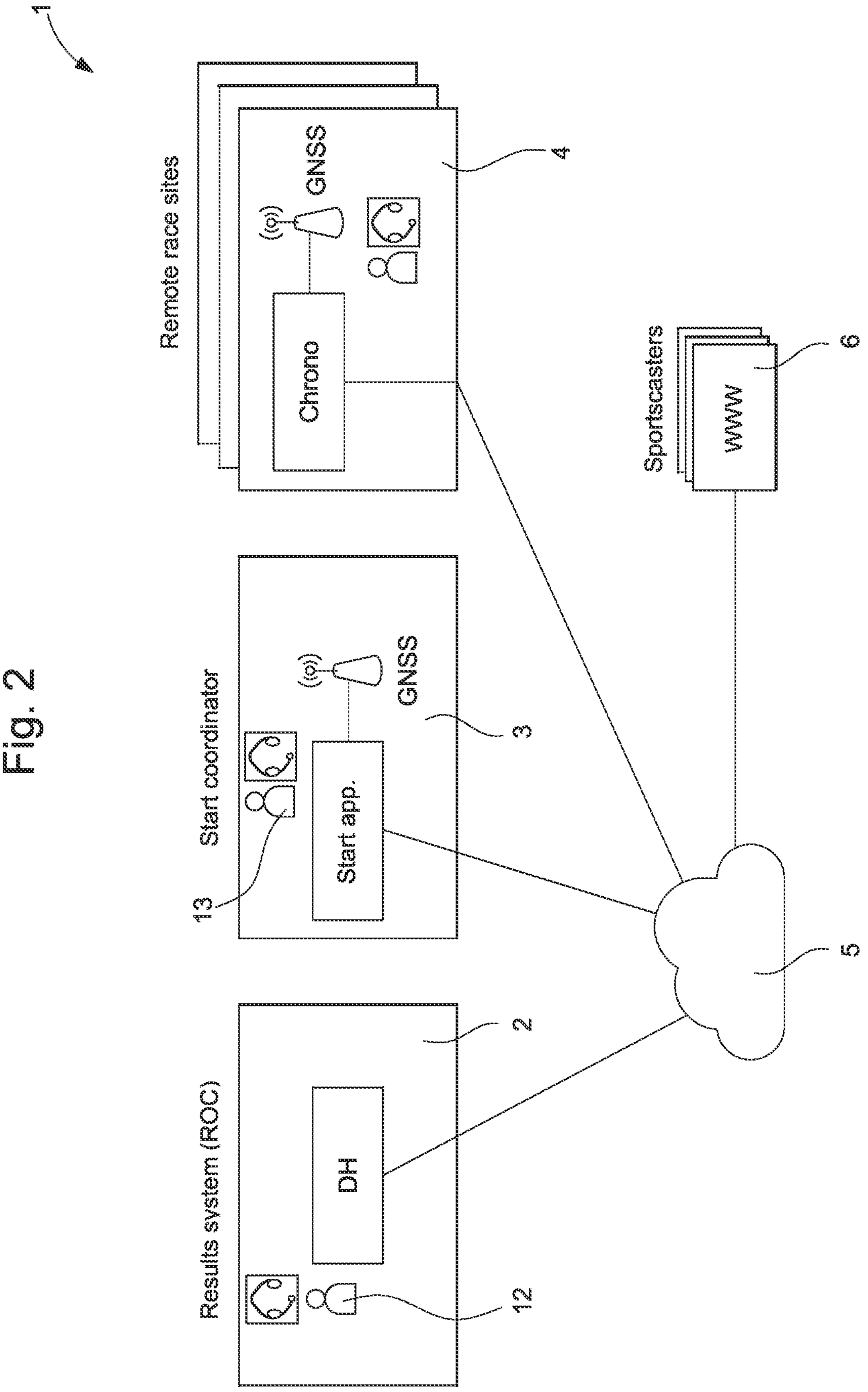
FIG. 2 represents an embodiment of the system for timing a sports competition at the same time on different sites with a synchronisation of the time bases by GPS signals according to the invention, FIG. 3 defines the different steps of a method for timing a sports competition at the same time in several different sites according to the invention.

In the following description, all elements of a system for timing a sports competition, that are well known to those skilled in the art in this technical field, will be related only in a simplified way.

FIG. 1 schematically represents an overview of the system 1 for timing a sports competition taking place at the same time on several different sites 4 around the world, as represented. A Remote Operation Center 2, referred to as ROC, is provided in the system 1 on a base site or on another site 4, in particular to process all of the results of the ongoing sports competition or on completion of the competition. The timing system 1 further comprises a start coordinator device 3, including a timing device. The start coordinator device 3 also serves in ordering the start of the sports competition on the site where the start coordinator device 3 is located, as well as on all of the other sites 4 of the same sports competition. The start coordinator device 3 may also be integrated in the remote operation circuit 2 if it is also located on the base site.

As shown in FIG. 1, the communication may be performed though a cloud-based computer service 5 for each component, because the remote operation center 2 could be in a location other than the start coordinator device 3, for example, on one of the sites 4.

As represented in FIG. 2 described hereinafter, a start coordinator device 3 is generally provided in the system 1 for ordering, for example by voice, the start sequence of a sports competition or of a race on each site 4 at the same time. For example, this may consist of voice instructions such as "set", "ready" and by pressing a button for the start of the race in the same manner as a pistol shot. The start time of the sports competition is given for each site at the same time once all necessary conditions are met, as explained hereinafter in FIG. 3 of the timing method. Of course, this start coordinator device 3 may be located on any site 4 as there is a communication in particular by wired or wireless internet communication means between the different sites 4, or in the remote operation center 2. However, it is preferably defined that the start coordinator device 3 is located on the base site. The communication may be performed through a cloud-based computer service 5 for each component as represented also in FIG. 1.

An accurate synchronisation of the time bases of each timing device of each site 4 is locally performed by a GPS signal. An accurate synchronisation of the time base of the start coordinator device 3 is locally performed by a GPS signal. The time synchronisation is applied to all of the timing devices of all sites 4 in communication for the conduct of the sports competition and of the start coordinator device 3.

It should also be noted that other means or methods for synchronising the different sites 4 may be provided for the system 1 for timing a sports competition. For example, the other methods are related to the network time protocols NTP or to the precision time protocol PTP [IEEE1588].

During the wireless communication of control or data or synchronisation signals, a transmission time from the start coordinator device 3 to each remote site 4, and also a transmission time from each site 4 to the start coordinator device 3, have to be taken into account.

As represented at the bottom of FIG. 1, in particular in the case of the transmission by the start coordinator device 3, there is a first transmission time Δt01 to be determined between the start coordinator device 3 and the first site 4. Since a response is transmitted by the first site 4, there is a first transmission response time Δt10 to be determined from the first site 4 to the start coordinator device 3. The same operations are performed between the start coordinator device 3 and the second site 4, on the one hand, and the third site 4, on the other hand. A second transmission time Δt02 is determined for the communication between the start coordinator device 3 and the second site 4, and a second transmission response time Δt20 is determined for the communication between the second site 4 and the start coordinator device 3. A third transmission time Δt03 is determined for the communication between the start coordinator device 3 and the third site 4, and a third transmission response time Δt30 is determined for the communication between the third site 4 and the start coordinator device 3.

As explained hereinafter in FIG. 3 of the timing method, the maximum transmission time during the communication between all sites 4 and the start coordinator device 3 is determined. Preferably, this maximum transmission time is doubled at least for the transmission time from the start coordinator device 3 to each site 4. This allows ensuring a safety when ordering the start of the sports competition at the same time on each site by the start coordinator device 3 and enables canceling of the start procedure if a site does not respond to the command.

FIG. 2 schematically describes a view of the timing technology. The different elements or components of the system 1 for timing a sports competition on several remote sites 4 at the same time are represented. First of all, the timing system 1 may comprise a remote operation center 2, which is monitored by an operator 12 throughout the progress of the sports competition. In particular, this remote operation center 2 is intended for processing the race results to be recorded and to transmit the results of the considered sports competition or of several successive sports competitions through a TV broadcast or on local display panels. A ranking of each participant on the different race sites 4 of the sports competition may be displayed so as to be viewed by the spectators on each site 4.

The system 1 further comprises a start coordinator device 3, which is preferably monitored by a judge of the sports federation 13. This start coordinator device 3 is provided for the user to signal, by voice, the start time of all participants on each site 4 at the same time, of course once all necessary conditions have been met as defined in the timing method described hereinafter. The voice instructions may also be pre-recorded and stored on each remote site in the timing device and, afterwards, played simultaneously on all sites upon a command of the operator. The start coordinator device 3 for timing may be located with the remote operation center 2 on the same base site.

It should also be noted that the information of the sports competition start signal is given to the participants of the sports competition in advance. As explained in the method hereinafter, the start hour is defined according to the estimated (maximum) delay or transmission time between all sites 4 and the start coordinator device 3.

Since there has to be a synchronisation of the different time bases of the sites 4, the start coordinator device 3 can have to transmit a command for synchronising the time bases of the timing devices of all sites 4 in communication. Under these conditions, its time base has to be already synchronised. This synchronisation is performed by GPS signals via a cloud-based computer service 5. As also represented in FIG. 1, this cloud-based computer service links all of the remote operation center 2, the start coordinator device 3, the different other sites 4 and also a link with sportscasters 6 to comment the progress of the sports competition.

As explained before, the start coordinator device 3 comprises a time-based timing device, which may also be synchronised by the GPS signals. The start coordinator device 3 may be placed in the remote operation center 2 thereby being on the same base site, which is the main site where the sports competition takes place, or on different sites.

FIG. 3 describes all of the steps of the method for timing a sports competition on several different sites at the same time. The start coordinator device is simplified and defined by the term COOR in the description of the steps of the method. This term COOR is mainly mentioned in the figures.

At the first step 100, a synchronisation of the time bases of each site and of the start coordinator device, if the time base of the timing is comprised within this device, has to be performed. At the second step 110, a measurement of the signal transmission time is performed in each direction between each site and the start coordinator device COOR, and the calculation of the periods Δtime used to guarantee the safe transmission of the start time, as explained hereinafter. Next, at the third step 120, a voice order is given by the operator or the judge of the start coordinator device, to all sites before the start of the race in order to warn the athletes of an imminent start. At the fourth step 130, the start coordinator device CORR initiates the start automatic procedure. At the fifth step 140, the start automatic procedure programs the start time on the sites. At the sixth step 150, it is determined whether all sites properly receive the start time or not. If so, we switch to the seventh step 160, in which the start coordinator device CORR with a timing device generates the start at the start time that has been set on the sites. At the eighth step 170, the start appears or is performed at the same time on all sites at the time $T0+\Delta time$.

If so is not the case, at the sixth step 150, if it is determined that not all sites properly receive the start time, we switch to a ninth step 180 in which the start coordinator device automatically abort the start procedure on all sites. A check-up of the communication between the different locations is done at the same time as a new measurement of the transmission times (return to the second step 110).

The calculation of this safety transmission time, to be taken into account to allow for a timing that is accurate and at the same time for each site to represent a conventional race with participants located on several sites remote from each other, is now explained. The start time is equal to the time of the day of the considered site T0 plus a time difference defined as Δtime.

This time difference has to be longer than the determined maximum transmission time between each site and the start coordinator device, preferably with a safety tolerance margin. This time difference may be defined according to the equation hereinbelow:

$$\Delta time=MAX[2\cdot\Delta tn0+\Delta tn1+\text{transmission time safety}]$$

where Δtn0 is a transmission time from the start coordinator device to one site, while Δtn1 is a return transmission time from the site to the start coordinator device. It is preferable to double the determined maximum transmission time from the device to each site and to add a safety tolerance margin comprising the return transmission time from the site to the device.

Even though there is still a small time difference at the start time to take into account the maximum transmission time from the start coordinator device to each site, this changes in no way the time of the race from the start to the end and is not perceptible by the spectators, as this small time difference is in the millisecond range. Hence, everything seems to the spectator as if takes place on live on all sites around the world for the same ongoing sports competition.

Figure 4:
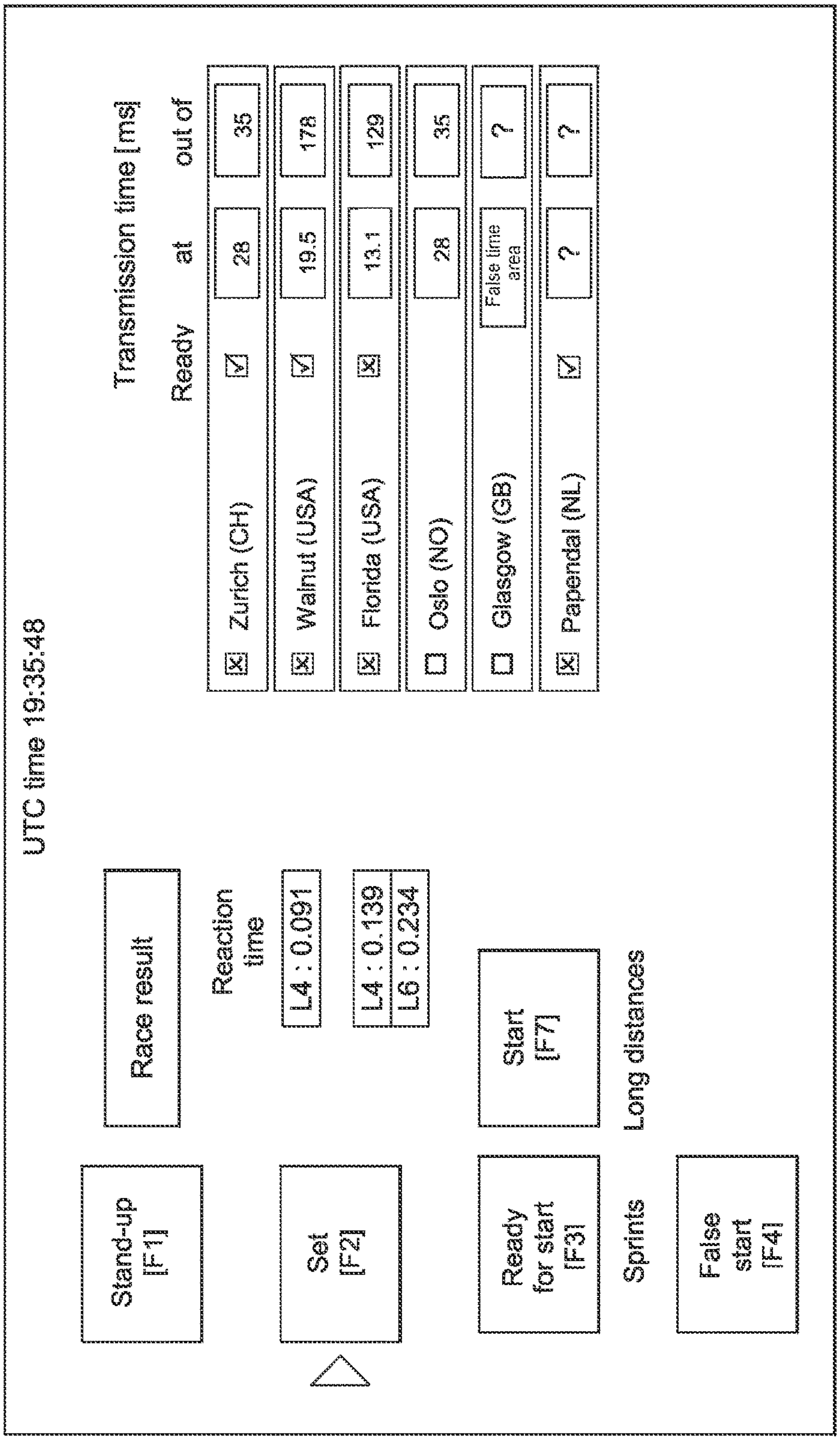
FIG. 4 represents an example of implementation of the application of the start coordinator device, capable of managing several different sites around the world with indications on the commands of the coordinator device until the start time and the display of the reaction time, different sites may be used for each race.

FIG. 4 represents only a display table for races taking place on several different sites around the world. Indications on the commands of the start coordinator device until the start time itself may be displayed. These commands are shown on the left side of FIG. 4. For example, for a running race, the different functions F1 to F4 for the preparation of each participant before the actual start or the false start, are specified. The table also illustrates the race results, in particular the different reaction times of the participants, and the display of the race result and of the reaction time. The different race locations with information on the state of the local timing system, for example whether it is ready for a start or not, are also represented.

From the description that has just been made, several variants of the method for timing a sports competition on several sites at the same time may be provided.

The invention claimed is:

1. A method comprising:

controlling, through a telecommunication network, a first time base, of a first timing device at a first site, and a second time base, of a second timing device at a second site, to synchronize based on at least one of global positioning system (GPS) signals, a network time protocol (NTP), and a precision time protocol (PTP), determining a maximum transmission time based on measuring a first signal transmission time, over the telecommunication network from the first time base to a start coordinator device, and based on measuring a second signal transmission time over the telecommunication network from the second time base to the start coordinator device;

determining a start time of the competition;

determining, after determining the start time of the competition, a time at which to indicate a start of the competition based on the maximum transmission time; and controlling, through the telecommunication network and from the start coordinator device, a first display at the first site and a second display at the second site to indicate the start of the competition at the time.

2. The timing method according to claim 1, wherein determining the maximum transmission time is further based on successively measuring the first signal transmission time and the second signal transmission times multiple times.

3. The timing method according to claim 2, wherein determining the maximum transmission time is further based on successively measuring the first signal transmission time and the second signal transmission times multiple times and at least once per second.

4. The timing method according to claim 1, wherein determining the time at which to indicate the start of the competition is further based on adding additional time to the maximum transmission time and determining the additional time by doubling the maximum transmission time.

5. The timing method according to claim 4, wherein the maximum transmission time is determined based on adding the first signal transmission time to the second signal transmission time.

6. The timing method according to claim 1, wherein the start coordinator device controls an output of an audible imminent start indication.

7. The timing method according to claim 6, wherein the audible imminent start indication is pre-stored at each of the first site and the second site.

8. The timing method according to claim 1, further comprising determining not to control the first display at the first site and the second display at the second site to indicate the start of the competition at the time based on determining that at least one of the first site and the second site did not acknowledge the start time of the competition.

9. The timing method according to claim 1, wherein the start coordinator device controls, through the telecommunication network, the first time base and the second time base to synchronize based on the at least one of the global positioning system (GPS) signals, the network time protocol (NTP), and the precision time protocol (PTP).

10. The timing method according to claim 1, wherein the start coordinator device controls, as a cloud-based computer service through the telecommunication network, the first time base and the second time base to synchronize based on the at least one of the GPS, the NTP, and the PTP.

11. The timing method according to claim 1, wherein the time differs from the start time by a tenth of a second or less.

12. The timing method according to claim 1, wherein determining the maximum transmission time comprises measuring variations in at least one of the first signal transmission time and the second signal transmission time.

13. A system configured to implement the method according to claim 1, the system comprising a remote operation center, the start coordinator device, the first timing device, and the second timing device.

14. The system according to claim 13, wherein the remote operation center is configured to control a display to display results of the race.

15. The system according to claim 14, the remote operation center comprises the start coordinator device.

16. The system according to claim 13, wherein the start coordinator device controls, as a cloud-based computer service through the telecommunication network, the first time base and the second time base to synchronize based on the at least one of the GPS signals, the NTP, and the PTP.

17. The system according to claim 13, wherein the start coordinator device is configured to determine the maximum transmission time based on successively measuring the first signal transmission time and the second signal transmission times multiple times.

* * * * *